(12) United States Patent
Eschbach et al.

(10) Patent No.: US 8,437,013 B2
(45) Date of Patent: May 7, 2013

(54) GLYPH-LOOKING ALPHABET FOR VIPP / SPECIALTY IMAGING FONTS

(75) Inventors: Reiner Eschbach, Webster, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 575 days.

(21) Appl. No.: 12/710,686

(22) Filed: Feb. 23, 2010

(65) Prior Publication Data

US 2011/0205569 A1   Aug. 25, 2011

(51) Int. Cl.
*G06K 15/02* (2006.01)

(52) U.S. Cl.
USPC ........... 358/1.11; 358/1.9; 358/3.2; 358/3.28; 382/100; 380/30; 380/28; 713/189; 283/72

(58) Field of Classification Search .................. None
See application file for complete search history.

(56) References Cited

U.S. PATENT DOCUMENTS

| | | | | |
|---|---|---|---|---|
| 5,917,996 A | * | 6/1999 | Thorpe | ........................ 358/1.14 |
| 2004/0001606 A1 | * | 1/2004 | Levy | .............................. 382/100 |
| 2007/0139680 A1 | | 6/2007 | Eschbach et al. | |
| 2007/0139681 A1 | | 6/2007 | Eschbach et al. | |
| 2008/0296885 A1 | | 12/2008 | Fan et al. | |
| 2008/0297852 A1 | | 12/2008 | Fan et al. | |
| 2010/0188710 A1 | | 7/2010 | Fan et al. | |

* cited by examiner

*Primary Examiner* — Benny Q Tieu
*Assistant Examiner* — Paul F Payer
(74) *Attorney, Agent, or Firm* — Fay Sharpe LLP

(57) ABSTRACT

A method of defining a glyph font character representing an input binary code includes defining a first portion of a matrix using an input binary code including a plurality of input bits. A second portion of the matrix is defined by performing a transformation on the input binary code so that the second portion of the matrix includes a plurality of transformed bits. A glyph character is derived that corresponds to the matrix. The glyph character is defined by a plurality of components corresponding in location to said bits of said matrix, wherein the components of the glyph character comprise a first component (e.g. a forward slash /) that corresponds to and represents a "1" bit of the matrix and second component (e.g., a backslash \) that corresponds to and represents a "0" bit of the matrix. The transformation operation includes a NOT operation or other logic operation, and includes a shift operation. The transformation can be repeated to derive additional portions of the matrix by transforming the group of bits of the preceding matrix portion. The glyph characters corresponding to alphabet characters are each defined as a bitmap and are saved as Postscript Type 3 font.

20 Claims, 5 Drawing Sheets

GLYPH-LOOKING ALPHABET FOR VIPP / SPECIALTY IMAGING FONTS

BACKGROUND

In producing documents for security applications, e.g., documents of high value or documents required for secure access or the like, it is desirable to add information into the document that prevents or at least hinders alterations and counterfeiting. In many cases, it is desirable to have this information included in a machine-readable form that cannot be encoded or decoded by an uninitiated third-party.

FIG. 1 is a greatly enlarged portion of a document D' including a printed (background) region PR' that is encoded according to a known glyph method so as to include information that can be used for security purposes (the printed region PR' of FIG. 1 is an example of a known system referred to as DataGlyphs by Xerox Corporation). In the system of FIG. 1, angular modulation of a slash character (forward slash "/" or backslash "\") is used to encode the "1" and "0" bits of a binary data stream. More particularly, a character such as a 7 bit ASCII character string is encoded by a bitstring ST', wherein some of the bits in the bitstring represent data bits and other bits represent error-check bits such as a parity bit or hamming code bits, etc. In the DataGlyph system of FIG. 1, however, each bit of the bitstring ST' must be individually addressed to define or decode the overall printed region PR'. With respect to decoding, this bit-by-bit processing prevents use of standard optical character recognition (OCR) software. On the other hand, an advantage of the glyph method of FIG. 1 is that the encoding is accomplished not by density (which is easily perceived by the human visual system), but instead by angular modulation of a base symbol such as a slash symbol that has first and second orientations. The slash is one preferred base symbol because neither the first nor the second orientations approach horizontal or vertical, which makes angular modulation thereof less perceptible to the human visual system, i.e., \ \ / / \ / / \ is less noticeable to humans that than the equivalent || – – | – – | when used as a background in a printed region PR'. As used herein, the term glyph is intended to mean a pattern defined by angular modulation of a single base character or symbol to encode data, with the slash character (forward slash and backslash) being one example.

It is also generally known to define a font, such as a Postscript Type 3 font or other for security applications, by creating a bitmap representation of each font character and storing same for use in a variable printing environment, e.g., Variable Data Intelligent Postscript Printware VIPP or Personalized Print Markup Language (PPML) or the like. A user can work with these fonts in conventional ways using word processing, graphic design, and other computer programs to define a digital document to be printed, and the font is then printed according to its definition (typically the font is displayed on a visual monitor in a manner that indicates its type to a user, but that does not actually show its true definition in order to make the font human readable and human useable on a computer monitor). Examples of such "security bitmap fonts" include:

- a gloss mark font in which each character is defined against a same-color background grey level, wherein the background and character are defined using respective anisotropic halftone dot structures that allows for human perception of the character at certain viewing angles without being susceptible to useful reproduction by digital or analog copying;
- a microtext font in which each character is defined at a size of less than 1 point, i.e., a height of less than about 0.3527 mm so as to be readable only with a loupe or magnifying glass;
- a correlation mark font in which the printed characters are visible only when a transparency key (often a 50% checkerboard grid pattern) is overlaid on the page.

The above mentioned examples of bitmapped effect fonts—referred to generally herein as "SI fonts"—are combined as Specialty Imaging feature in the Xerox Free Flow Variable Imaging Suite. In such case, each character of the font is precisely defined by a bitmap image to ensure proper placement of the ink/toner dots so that the desired effect is assured. In one known arrangement, a bitmap font for use in a gloss mark, microtext or correlation mark application is embedded or encapsulated in a PostScript Type 3 font format and saved at the printer, i.e., in the digital front-end (DFE) for use in such printing applications. These known SI fonts are human readable, either with the naked eye or using a tool such as a magnifier, an overlay, ultra-violet light, infra-red light, or other means.

U.S. patent application Ser. No. 12/359,502 filed Jan. 26, 2009 entitled Font-Input Based Recognition Engine for Pattern Fonts, the entirety of which is hereby expressly incorporated by reference into the present specification, discloses defining a font using glyph-like structures corresponding respectively to various characters of the font definition, and using the font to define the background of a digital image representing a document to be printed. When printed, the glyph-like structures encode information in the document background that can be decoded using OCR methods, by making the font definition (and any encryption keys) available to the scanner or other decoding system. As shown in FIG. 2A of the present application Ser. No. 12/359,502 generally discloses a step PA1 of creating an input string IS, a step PA2 of encrypting the input string IS to derive a coded string CS, and a step PA3 of converting the coded string CS to a font string FS using the predefined glyph font definition (the font string FS is shown as simple shaded boxes for ease of representation—see the enlarged detail for example of glyph font character/structure GF). The glyph font is used in a step PA4 to print a document D on paper or other recording medium, wherein the glyph font characters define a background or other printed region of the document D.

As shown in FIG. 2B of the present application Ser. No. 12/359,502 also generally discloses a step PA6 of scanning the printed document D to extract a font string FS' (the font string FS' is shown as shaded boxes for ease of representation; see enlarged detail for example of glyph font character/structure GF). In a step PA7, the extracted font string FS' is subjected to an OCR process that uses the glyph font definition to derive a coded string CS'. In a step PA8, the coded string CS' is decoded using a known key to derive an input string IS'. In a step PA9, the input string IS' is compared with the expected/required input string IS. If the input string IS' does not match the expected input string IS, the document is known to be counterfeit or otherwise defective.

This prior application Ser. No. 12/359,502 does not disclose a preferred design for the glyph font characters/structures GF. In particular, without a proper design, the need for redundancy results in groups of slashes that trigger the above-noted characteristics of the human visual system to become active in an effort to group and decode the slashes, which causes the font characters to become distracting and noticeable when used as a document background, and can also decrease security due to the presence of obvious repeating patterns. As such, it has been deemed desirable to provide a system and method for designing and using glyph font structures for enhanced security, aesthetics, customer exclusivity, and other real-world issues.

SUMMARY

In accordance with one aspect of the present development, a method of defining a glyph character representing an input binary code includes defining a first portion of a matrix using an input binary code including a plurality of input bits. A second portion of the matrix is defined by performing a transformation on the input binary code. The second portion of said matrix includes a plurality of transformed bits. A glyph character is derived that corresponds to the matrix. The glyph character is defined by a plurality of components corresponding in location to said bits of said matrix, wherein the components of the glyph character comprise a first component that corresponds to and represents a "1" bit of the matrix and second component that corresponds to and represents a "0" bit of the matrix.

In accordance with another aspect of the present development, a glyph font for digital images includes a plurality of glyph characters that correspond to respective alphabet characters. Each of the glyph characters includes a plurality of first components that correspond to and represent "1" bits of a matrix of bits and a plurality of second components that correspond to and represent "0" bits of the matrix of bits. The matrix of bits includes a first group of input bits that defines an input binary code that represents one of the alphabet characters. The matrix also includes a second group of transform bits that result from a transformation on the input binary code.

DETAILED DESCRIPTION

Figure 3:
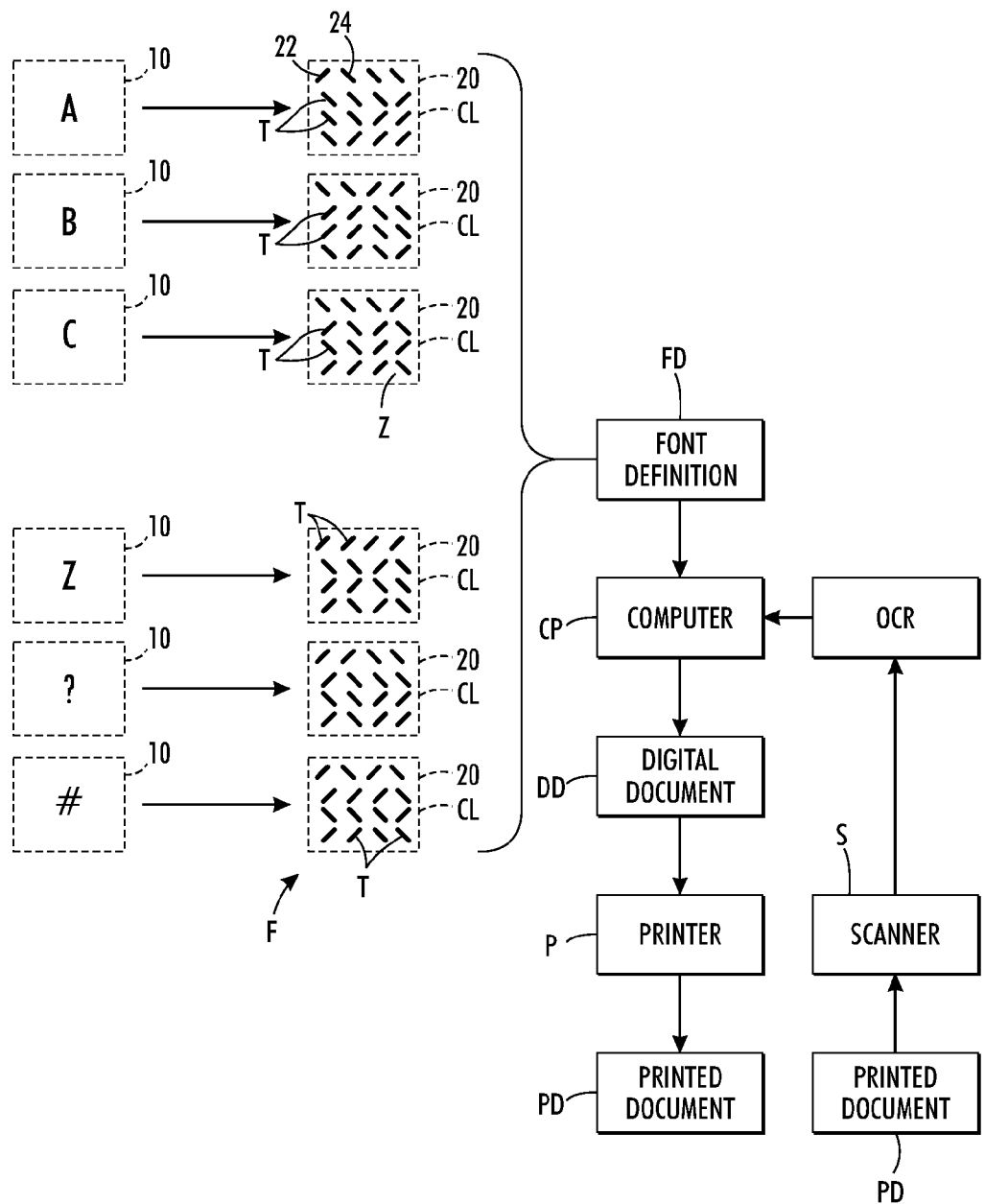
FIG. 3 illustrates a glyph font implemented according to the present development.

According to the present development, a glyph-looking (glyph) alphabet for VIPP/Specialty Imaging Fonts is provided that overcomes the above-noted issues and others. As shown in FIG. 3, according to the present development, each character 10 of an alphabet (e.g., a standard Latin alphabet) is encoded as a respective unique glyph symbol/structure/character 20 defined by a cell CL comprising a plurality of bit components T, such as the illustrated forward slash components /22 or backslash components \24. In some cases, the bit components T are referred to herein as "bits" of the glyph character 20. The overall group or plurality of glyph characters 20 define a font F that is used for word-processing and/or graphics design, with each glyph character 20 corresponding to a single one of the characters 10 of the alphabet represented by the font F.

The glyph characters 20, themselves, are each defined as a bitmap or other font structure and are encapsulated and saved in a font definition FD. The font definition FD is stored or otherwise made available to a word processing or graphic design or like software program being run on specially programmed general purpose (personal) computer or other computer CP being operated by a user to create a digital document DD including a region such as a background or other region including information encoded/embedded therein using one or more of the glyph characters 20. In one embodiment, the computer CP is the digital front-end (DFE) of an image printing system such as a xerographic image processing system.

The computer CP and software being run thereon are configured such that when a user selects and uses the font definition FD for generating the digital document DD, the alphabet characters 10 are displayed to the user on a visual display monitor (using inverse video, double-underlining, or other visual attribute to indicate their status as corresponding to glyph characters 20, instead of displaying the actual glyph characters 20 themselves) so that the user can read and understand the information that is to be encoded/embedded when the digital document DD is actually printed to provide a printed document PD. The computer CP is connected to a printer P such as an inkjet or xerographic printer for outputting a single colorant or multiple colorants onto paper or other recording media to create the printed document PD that corresponds to and represents the digital document DD including the background or other region defined by the glyph characters 20 according to the font definition FD.

Figure 1:
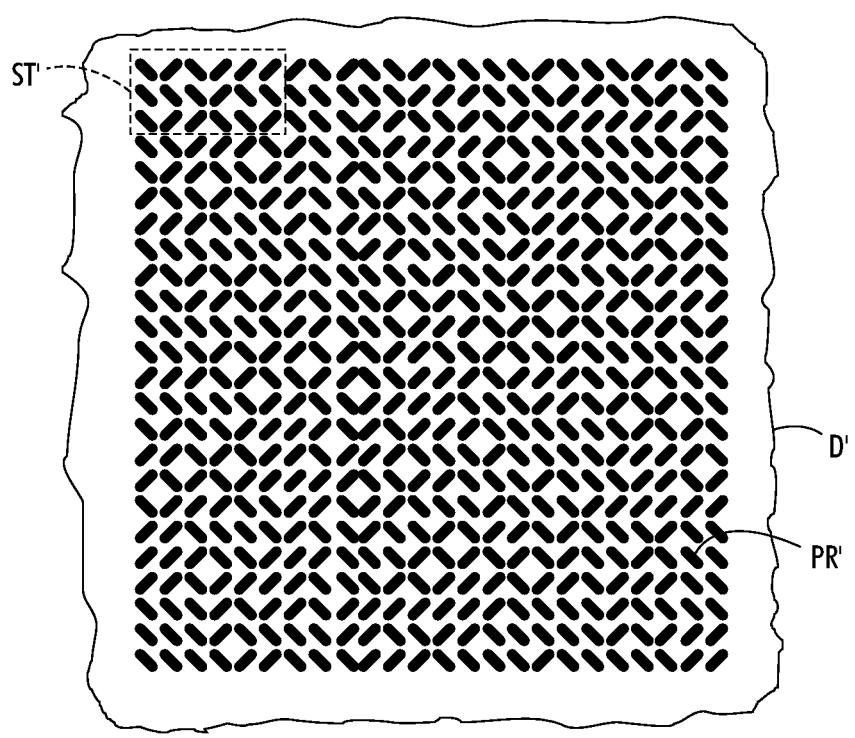
FIG. 1 is a greatly enlarged portion of a printed document including a printed (background) region that is encoded with information according to a known glyph method.
Figure 2A:
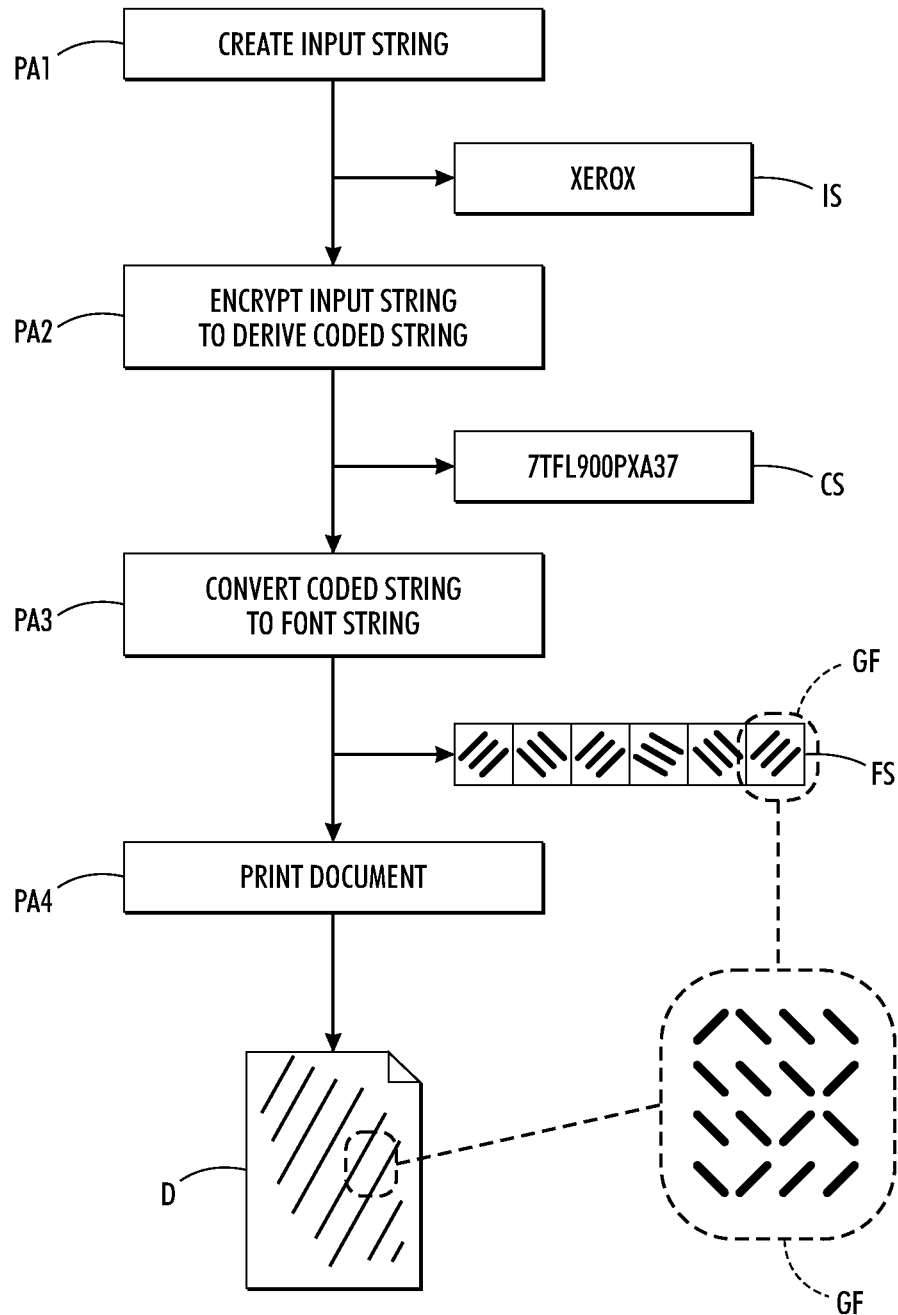
FIG. 2A illustrates a known process for encoding information in a printed document using glyph characters.
Figure 2B:
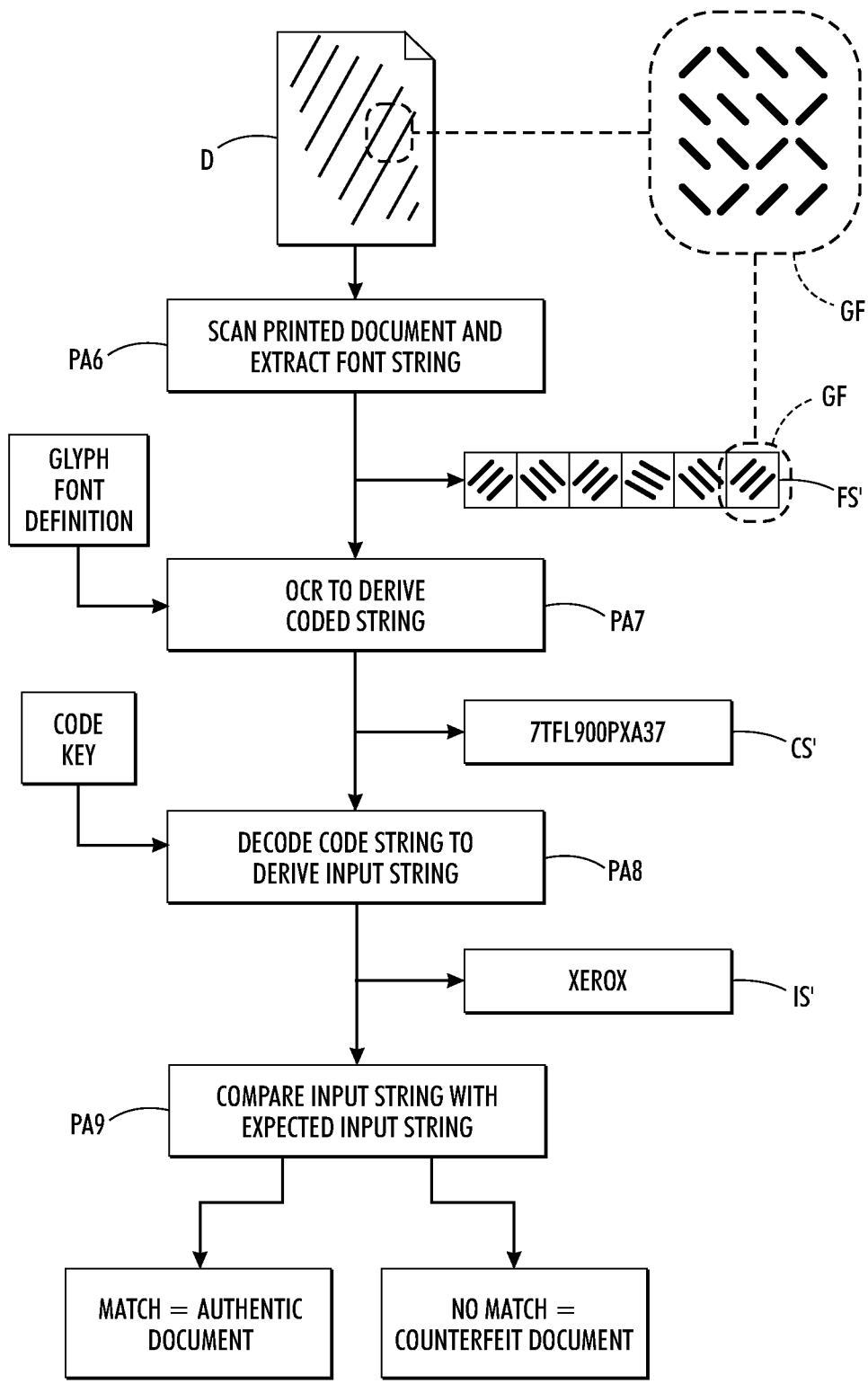
FIG. 2B illustrates a known process for decoding information from glyph characters contained in a printed document.

The computer CP for machine reading the printed document PD (and/or likely another separate computer) includes a scanner SC connected thereto for scanning a printed document PD such that the printed document can be subjected to an OCR operation as described above, wherein the OCR process has access to the font definition FD so that the OCR process can extract any glyph characters 20 present in the printed document PD for decoding of the information represented thereby. In this context it is understood that the term OCR process is a generic term, since the glyph-looking characters have no visual resemblance to a human readable letter and the OCR system therefore has to have access to the encoding information used in creating the digital document that was subsequently printed and scanned. In general, the computer CP is configured to perform the processes described above in relation to FIG. 2A and/or FIG. 2B, except that the font definition FD is implemented according to the present development to provide a proper design for the glyph characters 20.

A glyph font F designed in accordance with the present development will have the following properties:

1. The number of forward slash components 22 and backslash components 24 should be roughly equal within each glyph character 20. In other words, within each glyph character 20, there should be no large areas of uniform slash angles (no large areas of uniform forward slash/or backslash \ components) since visibility of such areas is directly influenced by size;
2. Redundancy repeats should not be obvious. Redundancy of bits T (forward slash components 22 and backslash components 24) required within each glyph character 20 should not be noticeable. This can be achieved by algorithmic modifications to the initial code (including spatial modifications). In one example as described herein, having redundancy repeats utilize an inverting operation will equalize the slash angle distribution;
3. A single algorithm can be used to create all glyph characters 20 of a font F. While it is theoretically possible to define all glyph font characters 20 by hand, real world systems require multiple possible glyph fonts F for a given alphabet 10.

4. The single algorithm to create the glyph font characters 20 (#3 above) must be able to create multiple mutually exclusive fonts in a repeatable manner for a given alphabet 10. For security applications, customers purchasing or using a computer implementing the font F will require a font exclusive to their system such that no two users can encode/decode the same glyph font characters 20. As such, the present development must be able to implement M different fonts F each containing N characters 20, beginning with a single starting pattern and using a key that allows each of the M different fonts F to be created dynamically and stored, without requiring all M different fonts to be stored or otherwise made available to the computer.

5. The font F should optionally include a marker code glyph font character 20 to detect start and periodicity of the encoded information.

Figure 4:
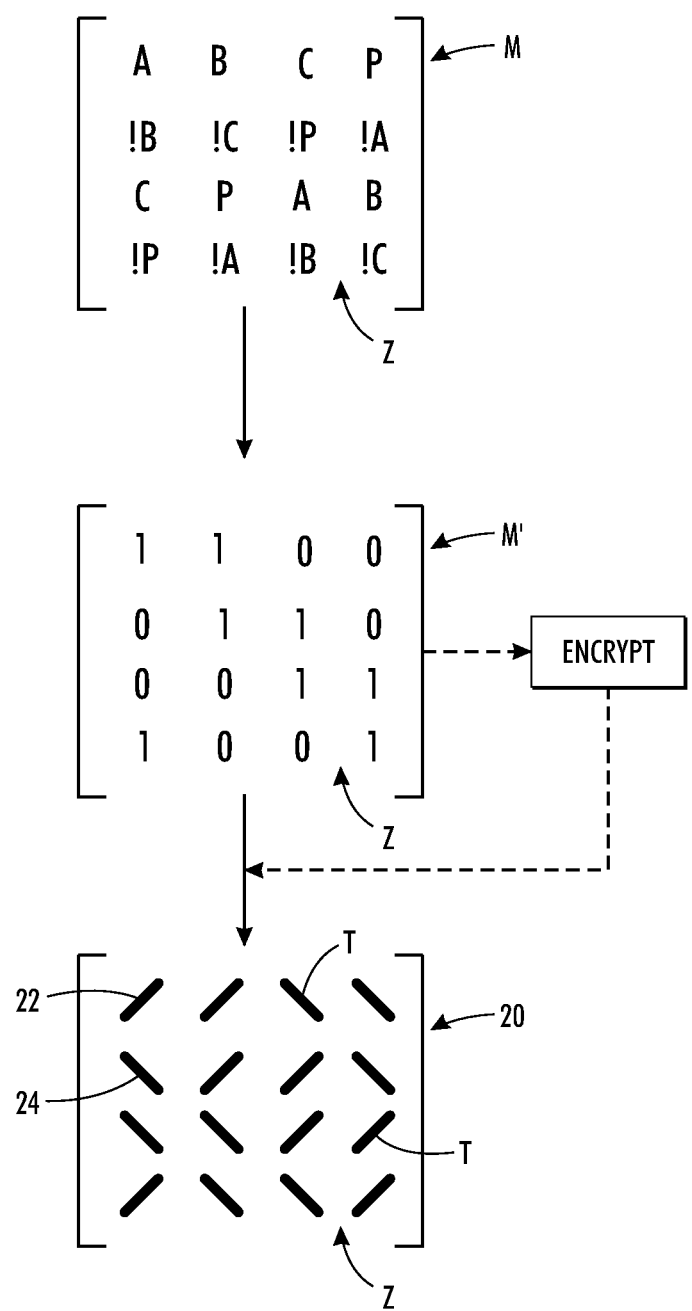
FIG. 4 illustrates design of a glyph font character according to the present development.

The above properties are explained further with reference to FIG. 4. For ease of understanding the present development the present example uses a 4-bit binary code ABCP which includes 3 data bits A B C and 1 parity bit P. As such, the 3 data bits A B C enable 8 different data codes to be represented. It will be understood by those of ordinary skill in the art that the general principles apply to binary codes of more or less bits, and that typically 8-bit or greater binary codes will be implemented (e.g., an ASCII alphabet can be implemented with an 8-bit code including 7 data bits and 1 parity bit or other similar scheme).

The number of bits in the code defines a code bit length L, and L=4 in the present example. The cell CL of each glyph font character 20 corresponds to a matrix M comprising r rows and c columns, where c=L (c=4 in the present example for bits A,B,C,P) and r represents the selected redundancy level, where r≧1 (r=4 in the present example because the bits A,B,C,P are repeated in 4 rows).

Also, a shift parameter S is specified, where S is a non-zero positive integer and S<L (the shift parameter is less than the code bit length L). Thus, for a code bit length L=4, S=1, 2, or 3 (FIG. 4 shows S=1). A logical operator is also selected, of which NOT is a preferred example. According to the present development, starting or input bit code A,B,C,P in row 1 is subjected to a logical NOT operation and shifted (to the left in the present example) by S bits to derive the transformed bits !B, !C, !P, !A that define the transformed binary code for row 2. The NOT/SHIFT operation in repeated to derive the transformed bits for row 3 from the transformed bits of row 2 and to derive the transformed bits of row 4 from the transformed bits of row 3 as shown. The transformation operation is repeated until all rows r of the matrix M are defined. In alternative examples, instead of NOT, the logical operator could be AND, OR, XOR, using either "1" or "0" as input to the logic operation along with the respective bit of the input binary code, and S can also be varied as noted. In one example, the above-noted requirement for deterministic but mutually exclusive font definitions for different users/customers is satisfied by using a random number generator with a defined seed to generate the shift parameter S (which can be right-shift or left-shift to provide added variability).

FIG. 4 also shows the actual matrix M' that corresponds to and that results from applying the above transform operations to a starting or input binary code 1,1,0,0.

FIG. 4 further shows the final glyph character 20 that corresponds to the matrix M', where the component bits T thereof are derived according to: 1=/ and 0=\ (alternatively 1=\ and 0=/). It can be seen that the above-noted critical design requirements 1-4 are satisfied.

For added security, as shown in broken lines, the bits defining each matrix M' can be encrypted before being transformed into the corresponding glyph character 20. For example, the bits defining each matrix M' can be subjected to a PGP or other encryption operation, and each different font definition could have its own corresponding encryption key. After the encryption operation, the glyph character is constructed using the forward slash 22 and backslash 24 bit components T.

It is understood that the starting bit length L preferably is larger that the actual number of bits (plus error correction bits) needed for the densest coding given the number of characters inside the font. It is also understood that the starting bit pattern [ABCP] of FIG. 5 can be replaced by sequence of that longer bit length L and that this enables a balancing of the two glyph elements "0" and "1" or "/" and "\". Two simple forms for a bit length of 8 are [ABCP!A!B!C!P], or [A!AB!BC!CP!P]. It is also understood that the rectangular design in FIG. 4 is exemplary and that the same bit-combination can be described in an 8×2, 2×8, 16×1 or 1×16 rectangle. Thus, the term "row" as used herein can be replaced by either of the more general teens "group" or "portion" to encompass these and other such variations, where the input binary code and its transformations are arranged in successive adjacent groups of bits that define a rectangular pattern.

In a preferred embodiment each glyph-looking character will have an identified synchronization area Z. This predetermined area will have a specific bit-pattern (or one of a small number of specific bit patterns) that can be used to ascertain that the OCR system is using the correct character area. This problem is not common in human readable character recognition since character boundaries are obvious, but in the patterns 20 of FIG. 3 this synchronization can potentially be lost if the scan processing advances one too many or two few columns, thus leading to potential mis-readings. An identified synchronization pattern in the simple exemplary scenario would be to replace the lower right [A B][!B !C] bits of matrix M in FIG. 4 with the fixed pattern [1 0][0 1]. This replacement does not alter considerably the redundancy in each character 20, as can be seen from FIG. 4.

As noted above, the font F can optionally include a marker code to detect start and periodicity of the font characters 20. Thus, the font F can include a special glyph font character 20 or character combination that identifies the start of encoded information in a printed document PD, and that indicates the dimensions of the font cells CL to assist in the OCR operation during decoding.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of defining a glyph character representing an input binary code, said method comprising:
    defining a first portion of a matrix using an input binary code including a plurality of input bits;
    defining a second portion of said matrix by performing a transformation on said input binary code, said second portion of said matrix comprising a plurality of transformed bits;
    deriving a glyph character that corresponds to said matrix, wherein said glyph character is defined by a plurality of components corresponding in location to said bits of said matrix, wherein said components of said glyph character comprise a first component that corresponds to and represents a "1" bit of said matrix and second component that corresponds to and represents a "0" bit of said matrix; and using a printer to print said glyph character on paper as part of a printed document, wherein said printed glyph character represents a corresponding alphabet character encoded in said printed document.

2. The method as set forth in claim 1, wherein said input binary code represents a character of an alphabet.

3. The method as set forth in claim 2, wherein said input binary code comprises at least one error bit.

4. The method as set forth in claim 2, further compromising:

identifying an area of the binary code and replacing said area with a predetermined synchronization code.

5. The method as set forth in claim 2, further comprising: defining a bitmap that represents said glyph character.

6. The method as set forth in claim 1, wherein said transformation comprises performing a logical operation on said input bits of said input binary code.

7. The method as set forth in claim 6, wherein said logical operation comprises a NOT operation.

8. The method as set forth in claim 6, wherein said logical operation comprises one of an AND, OR, XOR with one of "1" or "0".

9. The method as set forth in claim 6, wherein said transformation further comprises shifting said input bits of said input binary code.

10. The method as set forth in claim 9, further comprising: defining a third portion of said matrix by performing said transformation on said transformed bits of said second portion of said matrix.

11. The method as set forth in claim 1, wherein:

said first and second components of said glyph character comprise said forward slash character (/) and said backslash character (\), wherein said forward slash character corresponds to one of said "0" and "1" bits of said matrix, and said backslash character corresponds to the other of said "0" and "1" bits of said matrix.

12. An image printing system comprising:

a printer;

a digital front-end system comprising a computer operably connected to and controlling the printer; and, a glyph font for creating digital images, said glyph font stored as part of a font definition that is stored on said computer of said digital front-end, said font comprising:

a plurality of glyph characters that correspond to respective alphabet characters, each of said glyph characters comprising a plurality of first components that correspond to and represent "1" bits of a matrix of bits and a plurality of second components that correspond to and represent "0" bits of said matrix of bits, wherein said matrix of bits comprises:

a first group of input bits that defines an input binary code that represents one of said alphabet characters;

a second group of transform bits that result from a transformation on said input binary code.

13. The image printing system as set forth in claim 12, wherein said input binary code comprises at least one error bit.

14. The image printing system as set forth in claim 13, wherein each of said glyph characters is represented by a respective bitmap.

15. The image printing system as set forth in claim 14, wherein said second group of transform bits comprises a logical transform of said input bits of said input binary code.

16. The image printing system as set forth in claim 15, wherein said second group of transform bits further comprises a shift of said input bits of said input binary code.

17. The image printing system as set forth in claim 16, wherein said logical operation comprises one of an AND, OR, XOR operation with one of "1" or "0".

18. The image printing system as set forth in claim 16, wherein said logical operation comprises a NOT operation.

19. The image printing system as set forth in claim 16, wherein said matrix further comprises a third group of bits that result from performing said transform on said transformed bits of said second group of said matrix.

20. The image printing system as set forth in claim 12, wherein:

said first and second components of each glyph character comprise a forward slash character (/) and a backslash character (\), wherein said forward slash character corresponds to one of said "0" and "1" bits of said matrix, and said back slash character corresponds to the other of said "0" and "1" bits of said matrix.

* * * * *